United States Patent
D'Acquisto

(10) Patent No.: US 12,208,312 B2
(45) Date of Patent: Jan. 28, 2025

(54) CLIMBING STICK EXTENDER

(71) Applicant: Andrae D'Acquisto, Bellevue, IA (US)

(72) Inventor: Andrae D'Acquisto, Bellevue, IA (US)

(*) Notice: Subject to any disclaimer, the term of this patent is extended or adjusted under 35 U.S.C. 154(b) by 1028 days.

(21) Appl. No.: 16/974,302

(22) Filed: Dec. 19, 2020

(65) Prior Publication Data

US 2021/0187356 A1    Jun. 24, 2021

Related U.S. Application Data

(60) Provisional application No. 62/974,735, filed on Dec. 19, 2019.

(51) Int. Cl.
*A63B 27/00* (2006.01)
*A01M 31/02* (2006.01)
*E06C 1/38* (2006.01)

(52) U.S. Cl.
CPC ............ *A63B 27/00* (2013.01); *A01M 31/02* (2013.01); *E06C 1/381* (2013.01)

(58) Field of Classification Search
CPC . A63B 27/00; A63B 2210/50; A63B 2225/09; A01M 31/02; E06C 1/381; E06C 7/00; E06C 9/02; B68C 3/00
See application file for complete search history.

(56) References Cited

U.S. PATENT DOCUMENTS

| | | | | | |
|---|---|---|---|---|---|
| 983,875 | A | * | 2/1911 | Copet-Hardenne | A63B 27/00 235/31 R |
| 3,241,734 | A | * | 3/1966 | Gray | A01M 31/02 182/187 |
| 3,460,649 | A | * | 8/1969 | Baker | A01M 31/02 182/187 |
| 3,817,350 | A | * | 6/1974 | Gray | A01M 31/02 182/187 |
| 3,961,686 | A | * | 6/1976 | Starkey | A01M 31/02 182/187 |
| 4,022,292 | A | * | 5/1977 | Van Gompel | E06C 1/36 182/187 |
| 4,027,742 | A | * | 6/1977 | House, Jr. | A63B 27/00 182/92 |
| 4,061,202 | A | * | 12/1977 | Campbell | E06C 7/16 182/20 |
| 4,120,377 | A | * | 10/1978 | Charles | A63B 27/00 182/135 |
| 4,263,983 | A | * | 4/1981 | Norton | E06C 1/381 182/189 |
| 4,396,091 | A | * | 8/1983 | Anderson | A01M 31/02 224/184 |
| 4,422,527 | A | * | 12/1983 | Schultz | A63B 27/00 182/187 |
| 4,552,247 | A | * | 11/1985 | Purdy | A01M 31/02 182/178.3 |
| 4,618,028 | A | * | 10/1986 | Dale | A63B 27/00 248/230.8 |
| 4,620,610 | A | * | 11/1986 | Southard | A63B 27/00 182/228.1 |

(Continued)

*Primary Examiner* — Brian D Mattei
*Assistant Examiner* — Kathleen M. McFarland

(57) ABSTRACT

The present invention generally relates to an extender attachable to a conventional climbing stick and to a climbing stick comprising same. The present invention generally relates to an extender attachable to a conventional climbing stick and to a climbing stick comprising same.

11 Claims, 8 Drawing Sheets

(56) References Cited

U.S. PATENT DOCUMENTS

| | | | | |
|---|---|---|---|---|
| 4,674,597 A * | 6/1987 | Humphrey | A63B 27/00 | 248/230.8 |
| 4,723,630 A * | 2/1988 | Wolford | A01M 31/02 | 182/187 |
| 5,086,873 A * | 2/1992 | George | A63B 27/00 | 182/189 |
| 5,109,954 A * | 5/1992 | Skyba | E06C 1/10 | 182/189 |
| 5,267,632 A * | 12/1993 | Mintz | A01M 31/02 | 182/163 |
| 5,439,072 A * | 8/1995 | Jenkins, Jr. | E06C 7/081 | 182/100 |
| 5,509,499 A * | 4/1996 | Prejean | E06C 1/381 | 182/187 |
| 5,806,626 A * | 9/1998 | Jenkins, Jr. | E06C 7/081 | 182/189 |
| 5,809,754 A * | 9/1998 | Schulte | B68C 3/00 | 54/47 |
| 5,816,362 A * | 10/1998 | Jenkins, Jr. | E06C 7/081 | 182/189 |
| 6,003,632 A * | 12/1999 | Miller | E06C 1/34 | 182/187 |
| 6,006,864 A * | 12/1999 | Musk | A01M 31/02 | 182/187 |
| 6,547,035 B1 * | 4/2003 | D'Acquisto | E06C 1/34 | 182/100 |
| 7,066,300 B2 * | 6/2006 | Sylvia | A63B 27/00 | 182/135 |
| 8,439,162 B1 * | 5/2013 | Galloway | E06C 1/381 | 182/189 |
| 8,556,035 B1 * | 10/2013 | Kendall | E06C 1/381 | 182/189 |
| 10,973,224 B2 * | 4/2021 | Infalt | E06C 1/34 | |
| 11,026,417 B2 * | 6/2021 | Power, II | A01M 31/02 | |
| 11,161,732 B2 * | 11/2021 | Cabiran | B68C 3/00 | |
| 2003/0141147 A1 * | 7/2003 | Skipper | A01M 31/02 | 182/100 |
| 2003/0146048 A1 * | 8/2003 | Garbs | E06C 1/381 | 182/100 |
| 2004/0159279 A1 * | 8/2004 | Garelick | E06C 1/381 | 114/362 |
| 2005/0067225 A1 * | 3/2005 | Charley | A01M 31/02 | 182/136 |
| 2005/0230186 A1 * | 10/2005 | Bigard | E06C 1/381 | 182/100 |
| 2005/0284700 A1 * | 12/2005 | Sylvia | A63B 27/00 | 182/136 |
| 2007/0114096 A1 * | 5/2007 | Skipper | A01M 31/02 | 182/116 |
| 2008/0156588 A1 * | 7/2008 | Butcher | E06C 1/34 | 182/200 |
| 2008/0196972 A1 * | 8/2008 | Bell | E06C 1/58 | 182/136 |
| 2008/0210490 A1 * | 9/2008 | Guering | E06C 1/36 | 182/97 |
| 2011/0114416 A1 * | 5/2011 | Mayhew | A01M 31/02 | 182/107 |
| 2012/0125715 A1 * | 5/2012 | Furseth | E06C 7/081 | 72/253.1 |
| 2012/0199418 A1 * | 8/2012 | Priest | A01M 31/02 | 182/187 |
| 2014/0027204 A1 * | 1/2014 | Niemela | E06C 1/04 | 182/163 |
| 2014/0311828 A1 * | 10/2014 | Bassett | E06C 7/00 | 182/124 |
| 2014/0311829 A1 * | 10/2014 | Priest | A01M 31/02 | 182/187 |
| 2015/0196806 A1 * | 7/2015 | Wakefield, Jr. | E06C 9/04 | 182/187 |
| 2016/0024843 A1 * | 1/2016 | Niemela | E06C 1/10 | 182/189 |
| 2016/0069133 A1 * | 3/2016 | Priest | E06C 1/387 | 182/189 |
| 2016/0146240 A1 * | 5/2016 | Maistros, Jr. | F16B 41/002 | 29/525.02 |
| 2017/0122031 A1 * | 5/2017 | Priest | E06C 1/387 | |
| 2018/0073298 A1 * | 3/2018 | Hand | E06C 1/381 | |
| 2019/0055782 A1 * | 2/2019 | Infalt | E06C 1/38 | |
| 2021/0076666 A1 * | 3/2021 | Power, II | F16B 2/08 | |
| 2022/0088425 A1 * | 3/2022 | Miller | A62B 35/04 | |

* cited by examiner

CLIMBING STICK EXTENDER

FIELD OF THE INVENTION

The present invention generally relates to a climbing stick extender attachable to a conventional climbing stick or ladder module and to a climbing stick or module comprising same.

BACKGROUND OF THE INVENTION

Conventional climbing sticks and ladder modules are known. However, there is a never-ending desire to lighten the weight of climbing sticks. One such way to lighten the weight of climbing sticks is to shorten them. By shortening them, the height to which a hunter can climb is restricted. Accordingly, there is a need to lighten climbing sticks without restricting the height that a hunter can climb.

SUMMARY OF THE INVENTION

The present invention generally relates to an extender attachable to a conventional climbing stick or ladder module and to a climbing stick or module comprising same. The extender allows the hunter to use shorter, lighter sticks without sacrificing climbing height.

DETAILED DESCRIPTION OF THE INVENTION

The invention generally relates to an extender for climbing sticks and to climbing sticks comprising same. Climbing sticks, also referred to as ladder modules, are used for climbing trees for hunting or other purposes. The module includes a support member having a pair of support brackets mounted at the top and bottom ends of the support member. The brackets are generally V-shaped and include a number of teeth on the interior surface of the bracket that engage the tree on which the module is placed to prevent the module from slipping on the tree. In one embodiment these brackets that grip the tree when climbing pivot 360% allowing them to become flush with the body of the stick to minimize profile and to allow the sticks to nest closely together so that they can be easily carries/secured to the treestand of the invention.

The module also includes a releasable securing arrangement for securing the module about the tree. The arrangement comprises a belt having a buckle and a pair of straps removably engagable with a fastener mounted to the support member on the side of the support member opposite the support brackets. The configuration of the securing arrangement allows the belt to be selectively and releasably positioned on the support member to avoid any interference with the belt by limbs or branches extending from the tree. The module also comprises a number of steps, which are optionally rotatably mounted to the support member at the top, optionally the center depending on the length of the stick, and bottom of the support member opposite the support brackets. Each step includes a pair of annular shoulders on either side of the step that are engagable with a stop that can be directly fabricated into the support member, allowing the step to provide a stable, horizontal stepping surface when rotated to either side of the support member. Optionally, the stop can take the form of a bolt or other fabrication attached to the support member.

Alternatively, ladder modules such as rapid rails are known and resemble individual latter sections that can be strapped to a tree. The extenders of the invention are easily configurable to be used in conjunction with ladder modules, rapid rails or any other climbing aid. The terms climbing sticks and ladder modules are used interchangeable herein and are intended to encompass both types of climbing aids.

The extenders of the invention allow the user to extend the length of the climbing stick or module thereby increasing the height that the user can elevate using said stick. As an example, the effective length of a two-step climbing stick of approximately 24 inches can be extended an additional 6-20 inches or more through use of the extender of the invention with minimal additional weight. The extender of the invention can be affixed to any climbing stick though the use of various fasteners known in the art. Alternatively, the extender can be removably affixed to the climbing stick or module. When the extender of the invention is used with a rapid rail type ladder module it generally approximates a square or rectangular shape since rapid rail type modules have two outer support members rather than a single central support member.

The extender is preferably of metal or steel construction in the form of a steel cable or rigid metal fixture. The extender can also me made of other materials, e.g. Twaron, or other Aramid fiber construct so long as they are strong enough to support the weight of a user. In one embodiment the extender is of rigid construction such that it can be maintain a position that is 0-90 degrees from the vertical position of the climbing stick which allows the user easy access to place his/her foot in the extender. Upon the user placing his/her weight on the extender it will assume a substantially vertical position.

In another embodiment the extender is made of a durable steel cable such that it resilient enough such that it does not droop or sag under its own weight, optionally coated with a rubber covering or coating. In one embodiment the cable extender of the invention is attached to the center support post of a climbing stick through use of a fastener, for example steel eye end fasteners. In such embodiments the fastener optionally maintains the extender at an angle of at least 20 degrees, in another embodiment at least 30 degrees from the vertical position. Having the extender at such an angle allows the user to easily place his foot in the extender. Upon the user putting his weight on the extender it assumes a substantially vertical position, and when there is not weight on the extender it returns to a position that is at least 20 degrees, in another embodiment at least 30 degrees from the vertical position. By keeping a position that is at least 20, in another embodiment at least 30 degrees from the vertical position the user can easily locate and place his/her foot in the extender when climbing down from a tree.

In another embodiment, as depicted in FIGS. 8 and 9, each end of the extender has a steel eye end fastener attached thereto. Both ends of the extender are affixed to the center support structure by the bolt that attaches the lower step of the center support section. In this embodiment it is not necessary that the extender be angled as the extender is far enough from the tree to allow the user easy access. Alternatively, both ends of the extender are attached to a single steel eye fastener, which is then affixed to the center support structure via the bolt that attached the lower step to said support structure.

When using rapid rail type ladder modules, the fasteners are placed on each outer support member. Should the rails not mount far enough away from the tree, the extender and/or the fasteners can be angled such that they maintain the extender at an angle of at least 20 degrees, in another embodiment at least 30 degrees from the vertical position, which allows the user easy access when both climbing up and down a tree. If the extender sits far enough away from the tree it may be unnecessary to fix said extender at an angle since the extender will sit far enough away from the tree so as to allow the user easy access.

Use of the extender allows one to use a shorter, lighter climbing stick without sacrificing climbing height. For example, a 2-step climbing stick of approximately 24 inches in length with an extender according to the invention will provide climbing height approximately the same as a three-step climbing stick of approximately 36 inches in length. So four (4) 2-step sticks with extenders will give the user the same climbing height as four (4) 3-step sticks at a substantially reduced weight. Four (4) 3-step sticks with extenders will give the user the same climbing height as four (4) 4-step sticks. Accordingly, the extenders of the invention allow the user to use shorter, lighter sticks without sacrificing climbing height.

The extender of the invention can be rectangular in shape; in another embodiment triangular or teardrop shaped so as to allow the hunter to easily fit his or her foot into same. When used with a rapid rail ladder type climbing aid the extender is fastened to the two outer support members, causing the extender to be in a substantially square or rectangular shape. The length of the extender generally approximates the distance between steps on the climbing stick. In one embodiment the extender is approximately 6-20 inches in length, in another embodiment approximately 8-16 inches in length. The vertical sides of the extender are comprised of a rigid or semi-rigid material, for example a metal slat or a metal cable. The horizontal bottom portion is of rigid or semi-rigid construction such that is holds the extender in a triangular, teardrop, square or rectangular shape. The extender and or the means for attaching same to the climbing stick are fabricated such that the extender can maintain a position or angle of from about 20 to 90 degrees, in another embodiment 30-80 degrees, in another embodiment 30-60 degrees from the vertical plane to allow the hunter easy access to place his or her foot into same. In one embodiment the vertical sides of the extender are bendable such that they can maintain such position or angle. In another embodiment the fastening means is moveable away from the vertical plane to position the extender at said position or angle.

The climbing sticks of the invention are optionally equipped with plug style grommets to allow sticks to fit snugly together for easy transport. These plugs also fit into carrying ports located at pre-determined locations on the treestand platform.

The support member of the sticks optionally comprise hand grips cut right into the support member allowing for better grip when climbing. In one embodiment, the support member is not straight it jogs for added concealment and profile break up when in tree. Patterns and true edges are very unnatural in nature. The cutout designs cut out of support member of the sticks of the invention have no consecutive pattern to better blend in the wilderness.

The rope or strap for attachment to the tree comes through the stick from back to front allowing you the option of going around the tree in either direction opposed to the rope coming out of one side. Optionally, the rope attachment anchor can be built into upright section of stick for streamline attachment, or traditional attachment means can be used. The attachment anchor serves as a wedge for rope attachment opposed to dual cam mechanisms.

In its broadest embodiment the solid center support structure of the ladder module of the invention can be made of by any process, including machining from a solid metal workpiece, including aluminum and the like, and/or by a cast aluminum process. Any form of aluminum, aluminum alloy, or other metal/metal alloy can be used to fabricate the treestands of the invention provided that they are sufficient strength and not excessively heavy.

One option to obtain a lighter ladder module is to use a non-casted, support structure machined from one-piece plate stock. This machining process solid allows one to fabricate solid center support structures from a single piece of aluminum stock that are much lighter and stronger than cast platforms, but at a significantly greater cost.

In one embodiment the center support structure of the module of the invention is fabricated from a single aluminum workpiece by a waterjet process, optionally an abrasive waterjet process. Fabricating a solid one-piece center support structure with an abrasive water jet process allows one to make support structures that are even stronger and lighter than structures machined from one piece of plate stock. Utilizing a waterjet process allows one to reduce the wall thicknesses and still achieve the strength needed. Accordingly, the support structures of the present ladder modules of the invention made by waterjet process are among the strongest and lightest in the industry. Additionally, they are quieter and stealthier than prior art support structures that are generally of hollow tubular design.

In another embodiment the support member of the climbing stick or ladder module can be of hollow tube design.

The individual modules, or climbing sticks, used in forming these ladders have a simple construction comprised of a number of individual alternating steps secured to an elongate solid support structure. The individual steps are optionally pivotably mounted to the support member, allowing the steps to rotate from a closed, vertical position when the module is in transport or is not in use, to an open, horizontal position where the step points outward perpendicular to the support member to provide alternating stepping surfaces for the individual utilizing the module ladder. Alternatively, the climbing stick can have steps that are not pivotable and are fabricated directly from or welded to the center support structure. In such embodiments and as shown in FIG. 10, the extender of the invention can be affixed to either the center support structure or the steps that are fabricated from and/or welded to the center support structure.

The rapid rail type climbing stick substantially resembles individual ladder steps, i.e., this type of ladder module comprises 2 outer support members with steps between them similar to a conventional ladder. The extender of the invention can be affixed to the outer support members or to the lower step of said module.

Each module is secured to the tree trunk by a securing belt attached at one end by a bolt to one side of the support member. The belt is releasably secured at its opposite end to a belt hook or fastener attached to the center support member opposite the belt.

The module is supported on the tree by a pair of stabilizing brackets located at the upper and lower ends of the support member. The brackets engage the trunk of the tree to prevent the ladder module from sliding downwardly along the trunk while supporting an individual. The brackets are rotatably mounted to each end of the support member to allow each bracket to independently conform to the direction in which the tree trunk extends. The brackets that grip the tree when climbing pivot 360% allowing them to become flush with the body of the stick to minimize profile and to allow the sticks to nest closely together so that they can be easily carried/secured to the treestand of the invention.

The improved ladder module/climbing stick is specially adapted to form a modular ladder for climbing a tree to position and/or reach a tree stand. The module comprises a set of steps rotatably connected to an elongate, solid center support structurer. The steps have an arrowhead-like shape and are spaced from each other along the length of the support member to form an upper step, a middle step, and a lower step. The steps are rotatably mounted on a support member and are capable of rotating in either direction with respect to the support member to provide a grooved, non-slip stepping surface on either side of the support member. Each step includes a grooved stepping surface disposed on both long sides of each step that allow the steps to provide a non-slip stepping surface when rotated to either side of the support member. Also, on both sides of the point of attachment of each step to the support member are located a pair of annular shoulders, capable of restricting the rotation of each step with respect to the support member. Each shoulder engages a stop located beneath the step to selectively position the step outwardly on either side of the support member. The stop of the modules of the invention are optionally fabricated directly into the solid, one-piece center support structure. This improved step/stop construction allows the ladder module of the present invention minimizes parts that ordinarily would need to be installed/fastened to the center support structure. Finally, the modules of the invention can be used in situations where prior art ladder modules could not be used by providing steps that may be rotated in either direction on the support member to avoid any limbs or branches that may obstruct the rotation of the step in one direction.

Ladder modules also comprise a securing arrangement attached to the center support member used to secure the module to the tree. The arrangement includes a belt fastener disposed on the support member between the upper step and the middle step. In one embodiment the fastener is comprised of a stem extending outwardly from the support member and a radially extending flange attached to the stem opposite the support member that covers the stem. The flange provides an attachment point for a belt forming the remaining portion of the improved securing arrangement utilized with the ladder module. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. This securing arrangement is also able to be used on other devices utilized by hunters that are secured to a tree, such as tree stands.

DETAILED DESCRIPTION OF THE INVENTION

Figure 1:
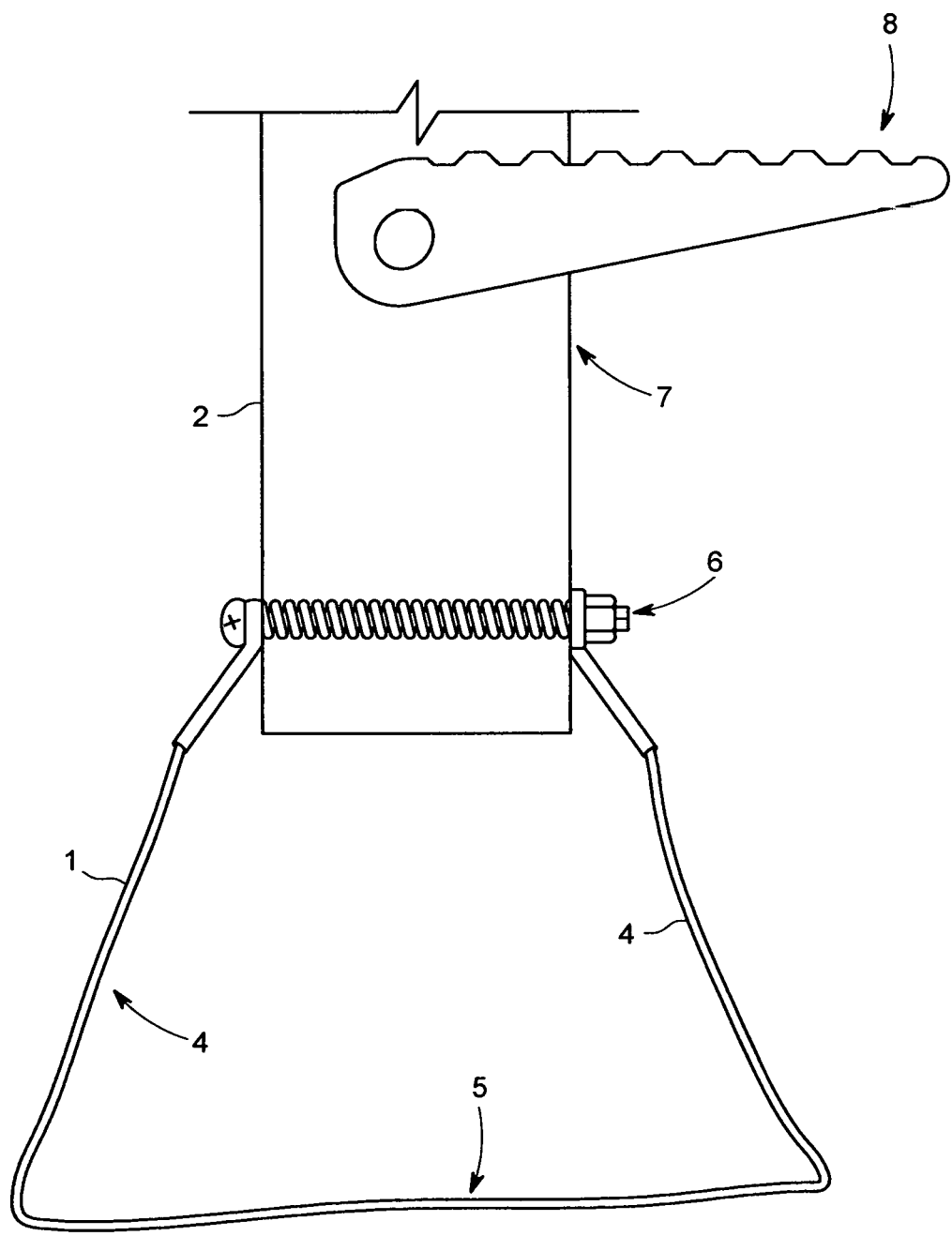
FIG. 1 is a side view illustrating the extender of the present invention in substantially triangular shape.
Figure 2:
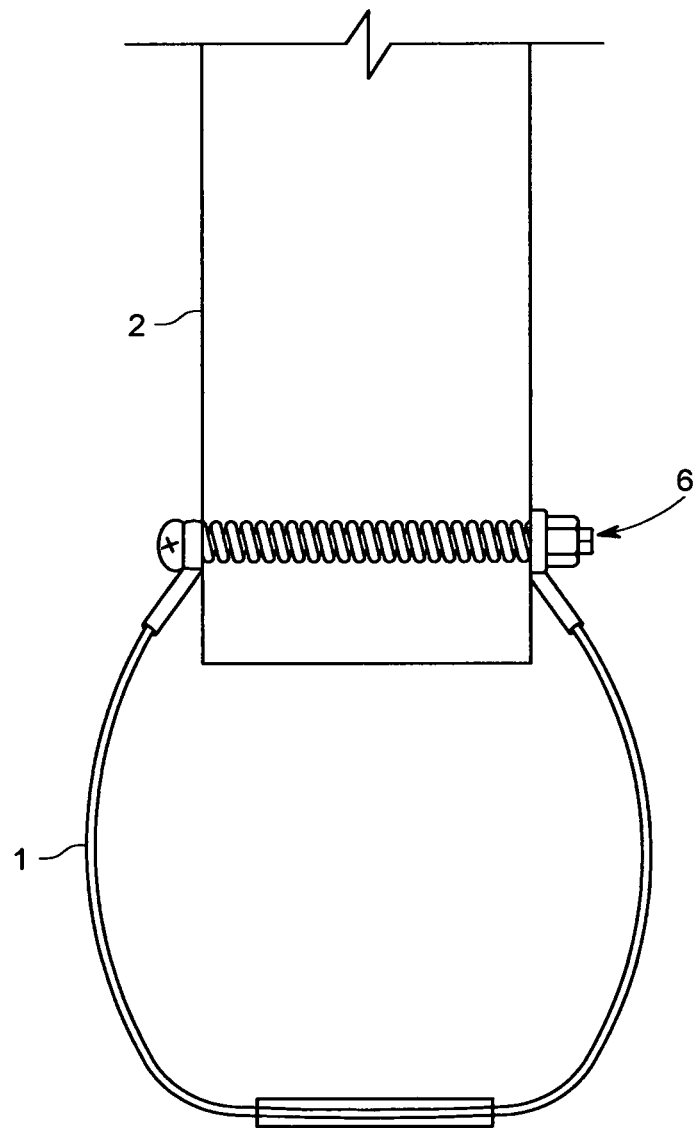
FIG. 2 is a side view illustrating the extender of the invention in substantially teardrop shape.
Figure 7:
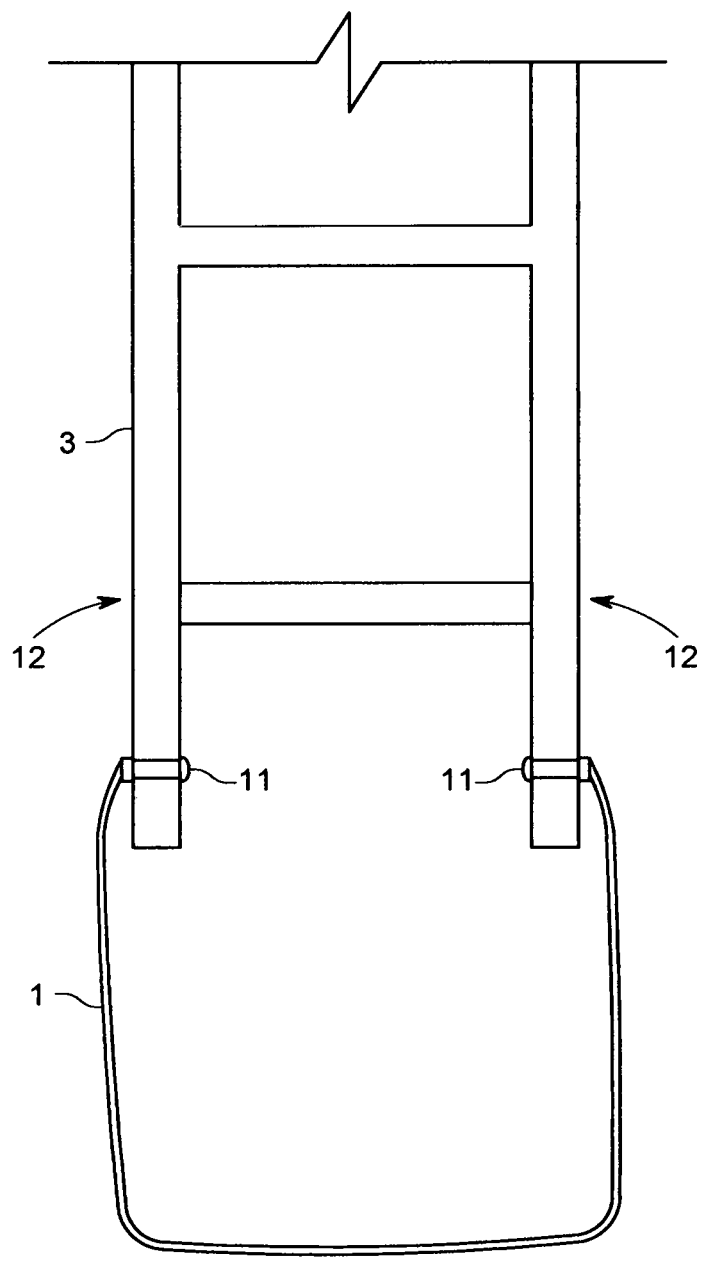
FIG. 7 shows the extender of the invention attached to a rapid rail type ladder module.

FIGS. 1, 2 and 7 illustrate the extender 1 of the invention and to a climbing stick 2 and ladder module 3 comprising same.

Referring to FIG. 1, the extender of the invention comprises two angled sides 4 and a horizontal bottom 5 in a generally triangular share. The length of the extender generally approximates the distance between steps on the climbing stick. In one embodiment the extender is approximately 6-20 inches in length, in another embodiment approximately 8-16 inches in length. The angled sides 4 of the extender are comprised of a rigid or semi-rigid material, for example a metal slat or a metal cable. The horizontal bottom portion 5 is of rigid or semi-rigid construction such that is holds the extended in its substantially triangular shape. The extender and or the means for attaching same to the climbing stick are fabricate such that the extender can maintain a position at an angle of from about 20 to 90 degrees, in another embodiment 30-80 degrees, in another embodiment 40-60 degrees from the vertical plane to allow the hunter easy access to place his or her foot into same. In one embodiment the angled sides of the extender are bendable such that they can maintain such position or angle. In another embodiment the fastening means comprises a tension bolt and a washer that is moveable away from the vertical plane to position and maintain the extender at said position or angle.

The climbing stick comprises a center support member 7 and also includes a number of steps 8 formed of a lightweight metal, preferably aluminum, that are spaced along one side and/or the other side of the support member. Each step is rotatably mounted to the support member to provide a stepping surface for an individual using the ladder module. In one embodiment, the steps are mounted to the support member near the top end, bottom end, and at the center of the support member. The steps are generally triangular in shape having a pair of stepping portions connected to each other at one end, forming a pointed end, and to opposite ends of a connecting portion opposite the pointed end. This configuration allows each step to provide a stepping surface on each stepping portion when the step is rotated to one side of the support member. To aid an individual using the steps on support member to climb the tree, each stepping portion includes a number of grooves spaced along its length. The grooves provide traction for the foot of the individual utilizing the step to help prevent the foot from slipping off the stepping portion of the step.

Each step is rotatably connected to the support member by a bolt inserted through an opening in the center of the support member. The bolt extends through an aligned opening passing through support member and is secured therein by a nut threadably mounted onto the bolt on the side of support member opposite the step. To facilitate the movement of each step with respect to the support member, a washer formed of a low friction material is preferably disposed between the step and support member around bolt.

Each step also includes a pair of curved shoulders disposed in opposite ends of connecting portion. When the step is rotated in either direction on support member, one of the annular shoulders contacts a stop positioned directly beneath the step on support member. Each annular shoulder engages the stop to laterally position the step such that each stepping portion provides a horizontal stepping surface on one side of the support member, depending upon the side of support member to which the step has been rotated. The stop is fabricated directly in the solid center support member.

The support member also includes a pair of support brackets mounted adjacent the top end and bottom end of the support member. The brackets are generally V-shaped, including an interior surface and an exterior surface. The brackets are rotatably mounted to each end of the support member to allow each bracket to independently conform to the direction in which the tree trunk extends. The brackets that grip the tree when climbing pivot 360% allowing them to become flush with the body of the stick to minimize profile and to allow the sticks to nest closely together so that they can be easily carried/secured to the treestand of the invention.

The brackets also include a number of teeth spaced along the length of each side of bracket that are generally triangular in shape having a point extending outwardly from the interior surface of bracket. The teeth on bracket engage the trunk of the tree to prevent the module from sliding down the tree when a person is climbing a tree utilizing the module.

The support member also has a securing arrangement to hold the module on tree. A fastener is secured to the support member between the steps. The fastener includes a cylindrical mounting sleeve extending outwardly from the support member and a circular retaining flange positioned on the mounting sleeve opposite the support member. The flange is preferably a metal washer having a diameter significantly greater than the sleeve and including a hole in the center of the flange. The sleeve and flange are secured to the support member by a bolt inserted into the support member through the hole in flange and through sleeve. The bolt extends through the support member and is secured to the support member opposite the fastener by a nut. The fastener provides a point on the support member used to removably attach each end of a securing belt to the support member in order to reliably secure the module to the tree.

The belt is comprised of a securing strap, a buckle strap, and a releasable buckle. The securing strap is an elongate strap of a durable material, such as nylon, that includes a free end and a loop integrally formed in the strap opposite the free end. The securing strap is removably attached to the fastener by placing the loop around the retaining flange of fastener. The flange prevents the loop from disengaging from the fastener, maintaining the securing strap in attachment, with the support member.

The buckle strap is formed of the same material as the securing strap and also includes a loop at one end that is also removably attached to the fastener. However, the end of buckle strap opposite the loop is attached to the buckle, which is placed around the tree to receive the free end of securing strap to secure the ladder module on the tree.

To attach the module to a selected tree, first, the securing strap and buckle strap are secured to the fastener on support member so that the securing arrangement and, namely, the buckle on buckle strap, will not be obstructed by any limbs extending from the tree. Next, the brackets are positioned against the center of the tree to position the support member in a generally vertical direction on the tree. The brackets may be rotated with respect to the support member to conform to the shape of the tree. Then, the straps and of the securing belt are wrapped around the tree in opposite directions, and the free end of securing strap is inserted through the buckle. The securing strap is pulled tight through buckle to securely fasten the securing belt about the tree. Finally, each step is rotated with respect to support member to extend one of the stepping portions on step to provide a horizontal stepping surface where desired on one side of the support member.

Figure 3:
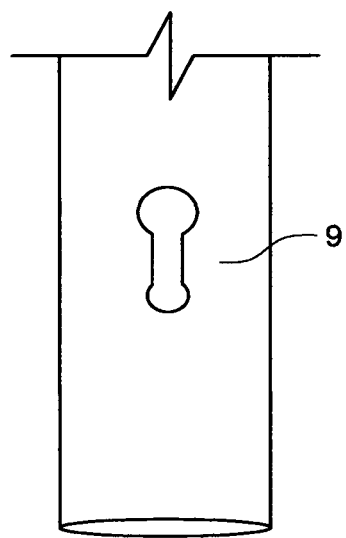
FIG. 3 shows a key-hole attachment embodiment of the extender to a climbing stick.
Figure 4:
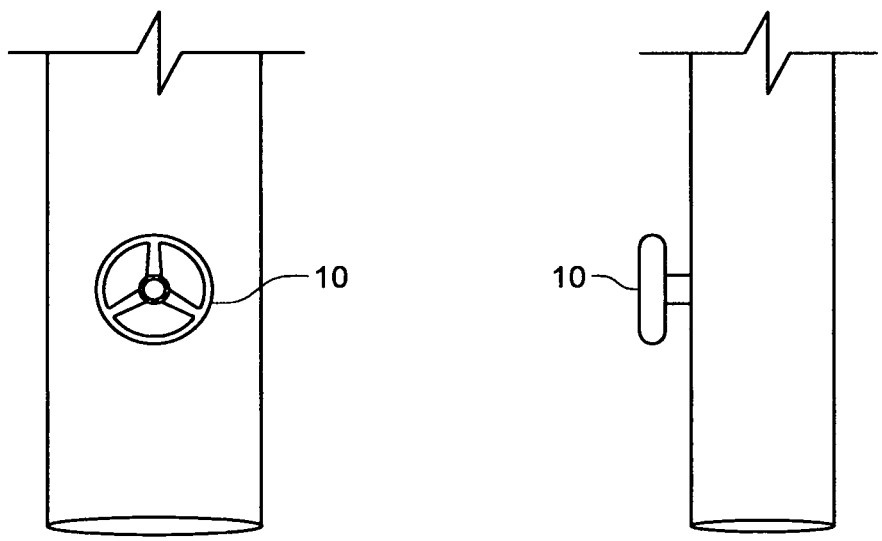
FIG. 4 shows a versa button attachment means for attaching the extender to a climbing stick.

FIG. 2 shows the extender of the invention attached to a climbing stick 2 wherein the extender is substantially teardrop shaped. The extender of the invention is attachable to the bottom portion of the climbing stick or ladder module by various fastening means including a tension bolt or similar fastener. The extender can also be releasably fastened to a climbing stick or module through a key-hole 9 as shown in FIG. 3 or versa button type 10 attachment means as shown in FIG. 4. Bolt 6 inserted through an opening in the center of the support member of said climbing stick or through each side support member of a ladder module or rapid rail type climbing stick. The bolt 6, preferably a tension bolt extends through an aligned opening passing through support member and is secured therein by a nut threadably mounted onto the bolt on the side of support member opposite the step. To facilitate the movement of the extender with respect to the support member, a washer formed of a low friction material is preferably disposed between the extender and support member around bolt.

The extender is generally of triangular or teardrop shape so as to allow the hunter to easily fit his or her foot into same. The length of the extender generally approximates the distance between steps on the climbing stick. In one embodiment the extender is approximately 6-20 inches in length, in another embodiment approximately 8-16 inches in length. The vertical sides of the extender are comprised of a rigid or semi-rigid material, for example a metal slat or a metal cable. The horizontal bottom portion is of rigid or semi-rigid construction such that is holds the extender in a triangular, teardrop, square or rectangular shape. The extender and/or the means for attaching same to the climbing stick are fabricated such that the extender can maintain a position or angle of from about 20 to 90 degrees, in another embodiment 30-80 degrees, in another embodiment 40-60 degrees from the vertical plane to allow the hunter easy access to place his or her foot into same. In one embodiment the angled sides of the extender are bendable and/or the section by which the extender is attached or fastened to the climbing stick is rotatable such that the extender can maintain such position or angle. In another embodiment the fastening means is moveable away from the vertical plane to position and maintain the extender at said position or angle. When the user puts his/her weight on the extender if assumes a substantially vertical position.

Figure 5:
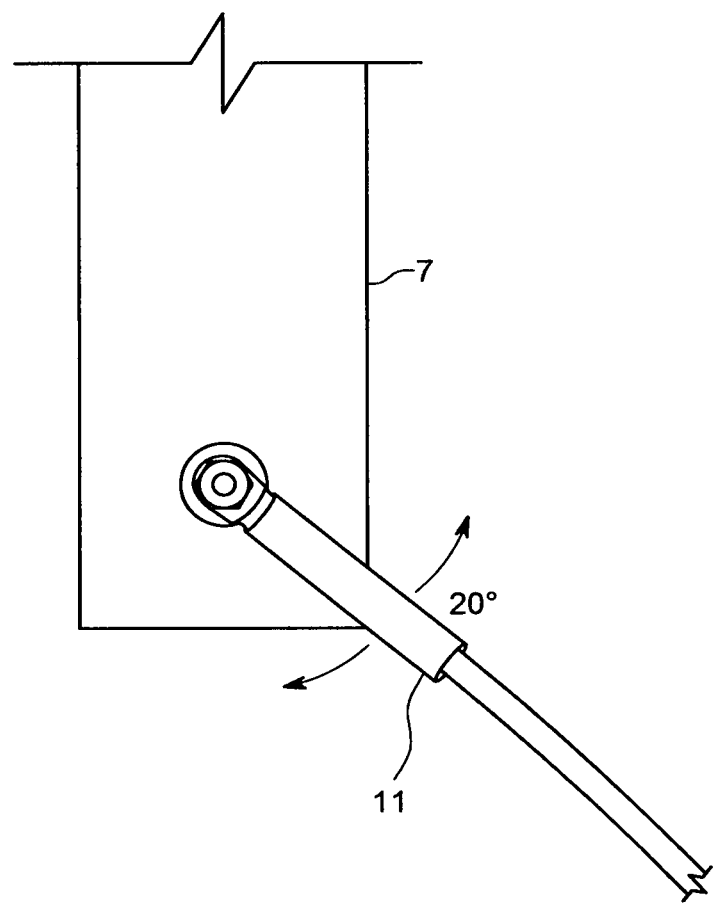
FIGS. 5 and 6 show a fastener for attaching the extender of the invention to a climbing stick, wherein the extender maintains the extender at an angle of at least 20 degrees from the vertical plane.
Figure 6:
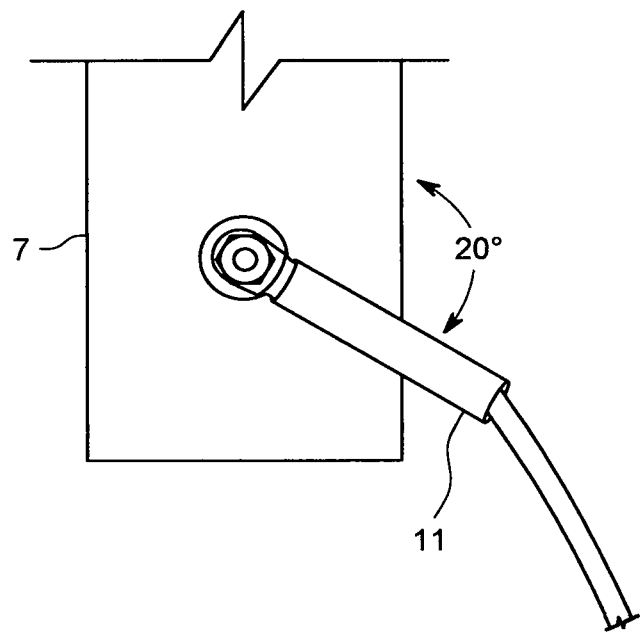

FIGS. 5 and 6 show the extender of the invention attached to the center support post 7 of a climbing stick through use of a fastener 11, wherein said fastener 11 maintains the extender at an angle of at least 20 degrees, in another embodiment at least 30 degrees from the vertical position. Having the extender maintained at such an angle allows the user to easily place his foot in the extender. Upon the user putting his weight on the extender it assumes a substantially vertical position, and when there is no weight on the extender it returns to a position that is at least 20 degrees, in another embodiment at least 30 degrees from the vertical position. By keeping a position that is at least 20, in another embodiment at least 30 degrees from the vertical position the user can easily locate and place his/her foot in the extender both when climbing up and down from a tree.

FIG. 7 shows rapid rail type ladder modules 3 where the fasteners 11 are placed on each outer support member 12 wherein said the fasteners are angled such that they maintain the extender at an angle of at least 20 degrees, in another embodiment at least 30 degrees from the vertical position, which allows the user easy access when both climbing up and down a tree. In one embodiment the extender attached to rapid rail type modules are of substantially square or rectangular shape.

Figure 8:
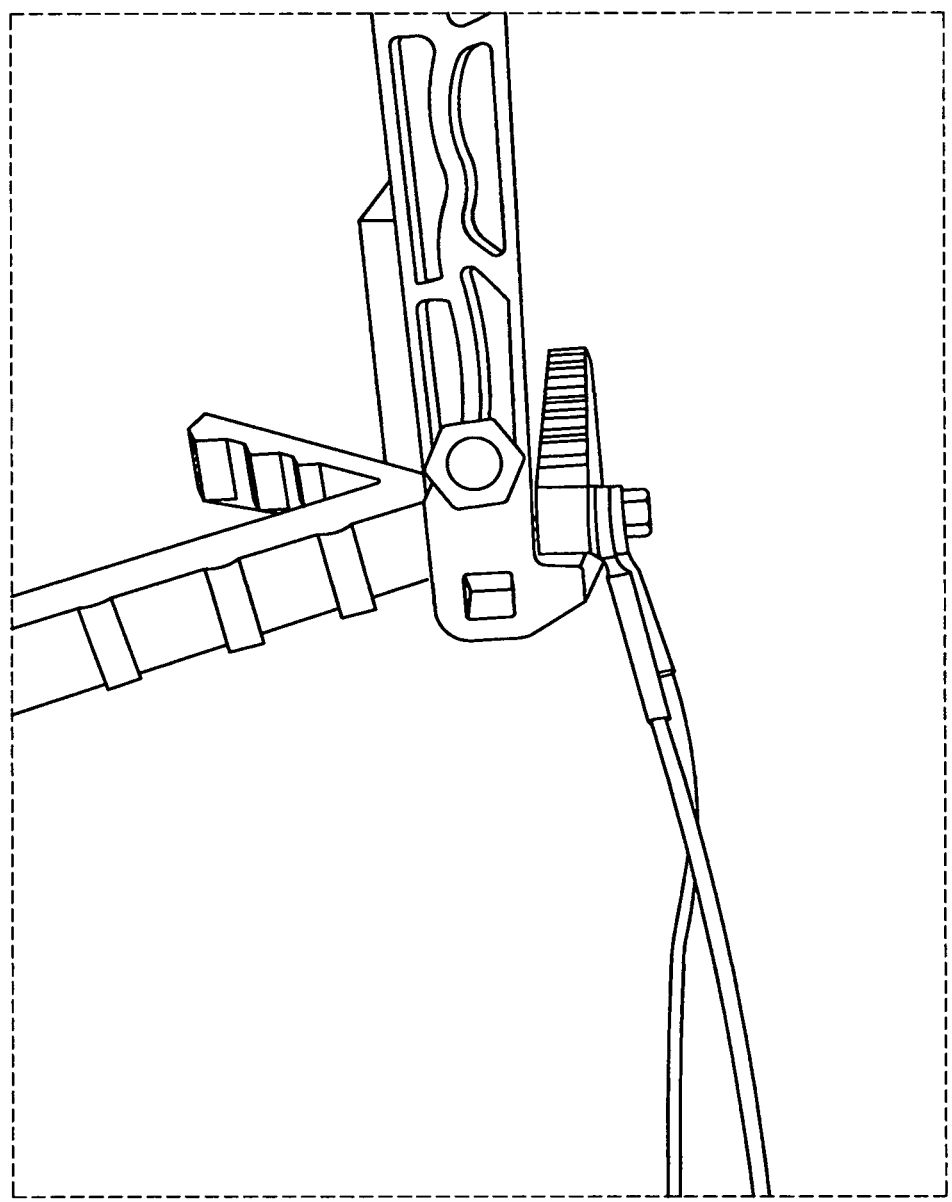
FIGS. 8 and 9 show the extender attached to the center support structure of a climbing stick via a bolt that attaches the lower step to said support structure.
Figure 9:
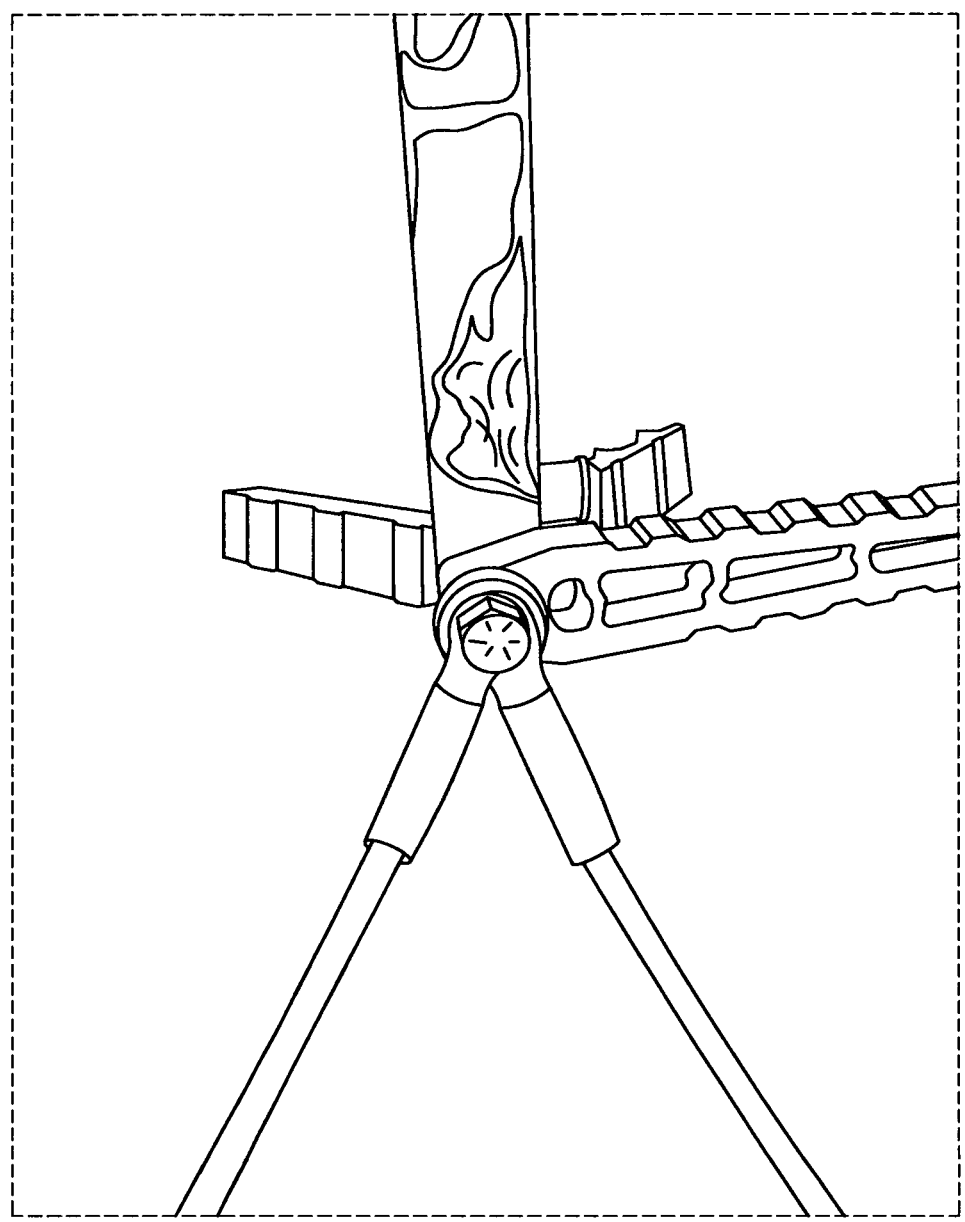

FIGS. 8 and 9 show the extender of the invention attached to the center support structure of a climbing stich via the bolt that attached the lower step to the bottom end of the climbing stick. Each end of the extender has affixed thereto a steel eye fastener, through which said bolt is threaded and affixed to the center support structure. In another embodiment both ends of the extender are attached to a single steel eye fastener, which is then attached to the center support structure by a bolt that also attached the lower step to the bottom end of said stick.

Figure 10:
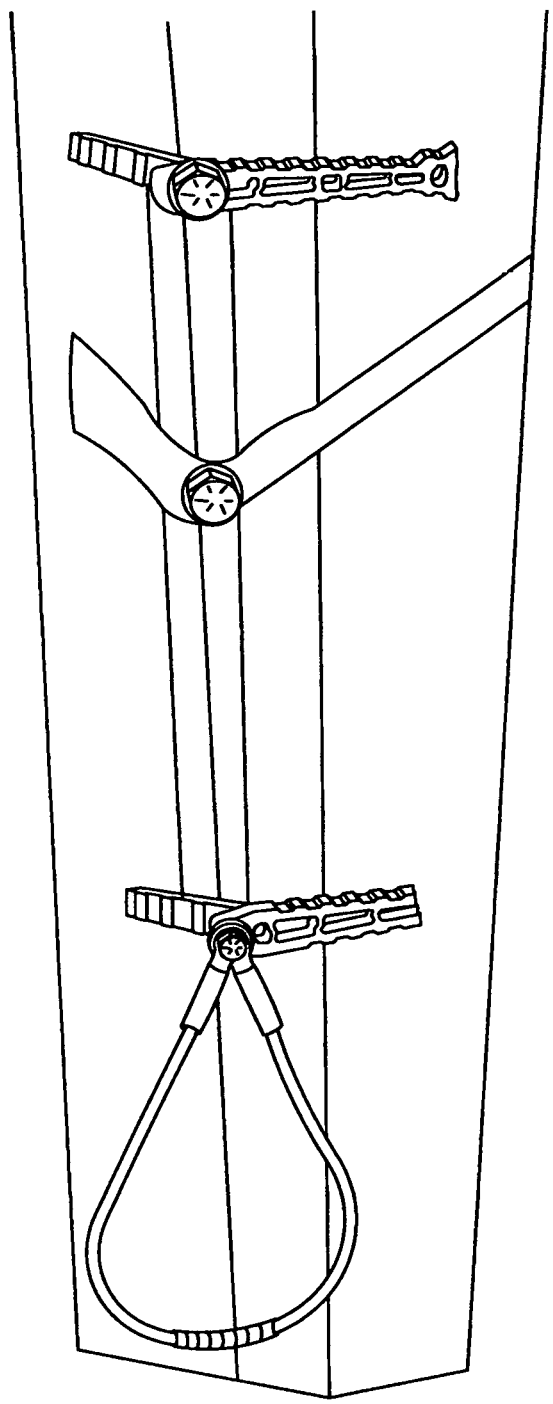
FIG. 10 shows a climbing stick with an extender attached thereto.

FIG. 10 shows a climbing stick with an extender attached thereto. The extender of the invention can easily be adapted to any climbing stick including lone wolf type climbing sticks 2, rapid rail type ladder modules 3 and the like. Various modes of carrying out the present invention are contemplated as being within the scope of the following claims particularly pointing out and distinctly claiming the subject matter which is regarded as the invention.

I claim:

1. A climbing stick extender wherein said extender is of substantially triangular or teardrop shape, wherein said extender comprises two angled support sides and a horizontal bottom section, wherein said bottom is of rigid or semi-rigid construction and maintains said extender in its substantially triangular or teardrop shape, and wherein each end of said extender comprises a fastener for affixing said extender to a climbing stick, wherein said fasteners maintain the position of said extender at an angle of at least 20 degrees from the vertical plane of said climbing stick.

2. The extender of claim 1 wherein said extender is a semi-rigid or rigid structure fabricated from steel.

3. The extender of claim 1 wherein said extender is a flat steel, tubular steel or of a steel cable structure.

4. The extender of claim 3 wherein said extender is affixed to the lower end of a climbing stick.

5. The extender of claim 1 which is 6 to 20 inches in length, wherein said angled support members are fabricated of a semi-rigid metal cable.

6. The extender of claim 1 which is releasably or permanently secured to a climbing stick.

7. A climbing stick comprising the extender of claim 1.

8. A climbing stick comprising: a) a solid elongate center support structure having a top end and a bottom end; b) at least two stabilizing brackets mounted to the support member, wherein said stabilizing brackets are rotatable 360° to allow efficient nesting of two or more climbing sticks one to the other; c) at least two steps mounted to the support member opposite the at least two brackets; and d) an extender according to claim 1 releasably affixed to said climbing stick.

9. The climbing stick of claim 7 wherein said extender extends the climbing height of said stick by an additional 6-18 inches.

10. The climbing stick of claim 9 wherein said wherein said fastener maintains the position of said extender at an angle of from at least 20 degrees from the vertical plane of said climbing stick up to 90 degrees from the vertical plane of said climbing stick, wherein said extender maintains said position until the weight of the user is applied to said extender wherein said extender assumes a near vertical position.

11. The climbing stick of claim 9 wherein said fastener of said extender is a steel eye fastener affixed to the center support structure of said climbing stick with a bolt or tension bolt.

* * * * *